United States Patent [19]

Seki et al.

[11] 4,097,561
[45] Jun. 27, 1978

[54] IDLE MIXTURE ADJUSTING DEVICE OF CARBURETOR

[75] Inventors: Chichitada Seki, Yokosuka; Nobuo Furuhashi, Tokyo, both of Japan

[73] Assignee: Nissan Motor Company, Limited, Japan

[21] Appl. No.: 758,815

[22] Filed: Jan. 12, 1977

[30] Foreign Application Priority Data

Apr. 23, 1976 Japan .............................. 5151735[U]

[51] Int. Cl.² .............................................. F02M 3/08
[52] U.S. Cl. .............................. 261/41 D; 137/382.5; 261/DIG. 38
[58] Field of Search ................... 261/41 D, DIG. 38; 137/382.5, 385; 251/292

[56] References Cited

U.S. PATENT DOCUMENTS

| 624,628 | 5/1899 | Corey, Jr. .............................. 251/292 |
| 1,420,434 | 6/1922 | Margulies ........................... 137/382.5 |
| 1,426,154 | 8/1922 | Cox et al. ............................ 137/382.5 |
| 1,495,696 | 5/1924 | Kinnie et al. ....................... 137/382.5 |
| 3,618,906 | 11/1971 | Charron ............................ 261/DIG. 38 |
| 3,669,424 | 6/1972 | Shiobara et al. ........................ 261/63 |

FOREIGN PATENT DOCUMENTS

| 44,035 | 4/1931 | Denmark ........................... 137/382.5 |
| 548,772 | 1/1930 | Germany .......................... 137/382.5 |
| 969,349 | 9/1964 | United Kingdom .............. 137/382.5 |

*Primary Examiner*—Tim R. Miles

[57] ABSTRACT

An idle adjustment screw of a carburetor is covered by a cap having a particularly shaped slot. The adjustment screw can be turned to change or adjust the idle mixture only with a particularly designed adjusting tool which can pass through the slot of the cap and be engageable with the groove or the projection formed on the head of the adjustment screw.

7 Claims, 20 Drawing Figures

COMBUSTION CHAMBER

IDLE MIXTURE ADJUSTING DEVICE OF CARBURETOR

This invention relates to a device for adjusting the idle mixture produced by a carburetor of an internal combustion engine.

It is the prime object of the present invention to provide an improved idle mixture adjusting device of a carburetor of an internal combustion engine, by which device an unnecessary change of the idle mixture may be made impossible to prevent the emission of noxious gases from the engine into the circumferential air.

Another object of the present invention is to provide an improved idle mixture adjusting device of a carburetor of an internal combustion engine, by which device usual drivers cannot unnecessarily change the setting of the idle mixture, but the idle mixture may be changed and adjusted when necessary with a particularly designed adjusting tool which may be equipped in service factories.

Other objects, features and advantages of the present invention will become more apparent from the following description of the various examples thereof, taken in conjunction with the accompanying drawings in which like reference numerals designate like parts and elements throughout the various examples, in which.

Modern carburetors for an internal combustion engines are equipped with idle adjustment screws for adjusting an idle mixture supplied to the combustion chambers of the engine. The idle adjustment screw is usually such precisely set, using an exhaust gas analyzer equipped in factories or service factories, that the carburetor supplies the combustion chambers of the engine with the idle mixture having an air-fuel ratio appropriate for noxious gas emission control. However, the thus set idle adjustment screw may easily be turned by drivers or other physical forces applied thereto to change the air-fuel ratio of the idle mixture. This change of the air-fuel ratio may cause undesirable high emission levels of the noxious gases.

Figure 1:
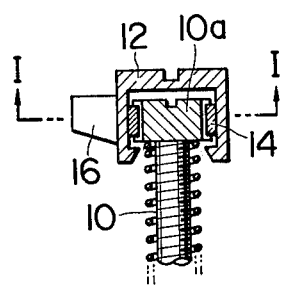
FIG. 1 is a vertical section view of a prior art idle mixture adjusting device.
Figure 2:
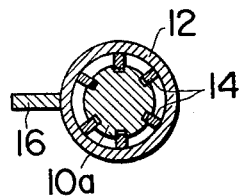
FIG. 2 is a section view taken in the direction of the arrows substantially along the line I—I of FIG. 1.
Figure 3:
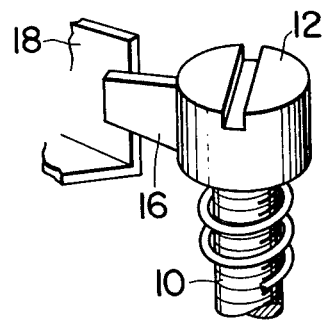
FIG. 3 is a perspective view of the prior art idle adjusting device of FIG. 1.

In view of the above fact, a device for limiting the turning movement of the idle adjustment screw has been proposed to prevent an excess turning of the idle adjustment screw. An example of the turning movement limiting device is shown in FIGS. 1 to 3 which illustrate a prior art idle mixture adjusting device, in which the screw head 10a of an idle adjustment screw 10 is securely covered with a limiter cap 12 which is fixed through a plurality of members 14 with the screw head 10a. The limiter cap 12 is formed with a projection 16 which is engageable or strikable with a stop 18 secured to the body of a carburetor (not shown). With this arrangement, only about one turn of the idle adjustment screw is permitted and therefore a considerable deterioration of the emission control may not be occurred.

However, a problem has arisen with such a limiting device as mentioned hereinbefore, in which an appropriate air-fuel ratio of the idle mixture may not be obtained due to the limitation of turning of the idle adjustment screw when the atmospheric temperature and pressure are considerably changed from the levels at which the idle adjustment screw was set, such as during extremely cold and hot weathers and high altitude ground cruising. If the limiter cap can be removed, the adjustment of the idle mixture during such conditions will be easily accomplished, but the limitation of turning the idle adjustment screw will be failed.

Therefore, the present invention contemplates that the idle adjustment screw cannot be turned by usual drivers with usual tools, but can be turned with particular tools prepared, for example, in the service factories. This fact makes possible the adjustment of the idle mixture when required although the idle mixture adjustment is usually impossible.

Figure 4:
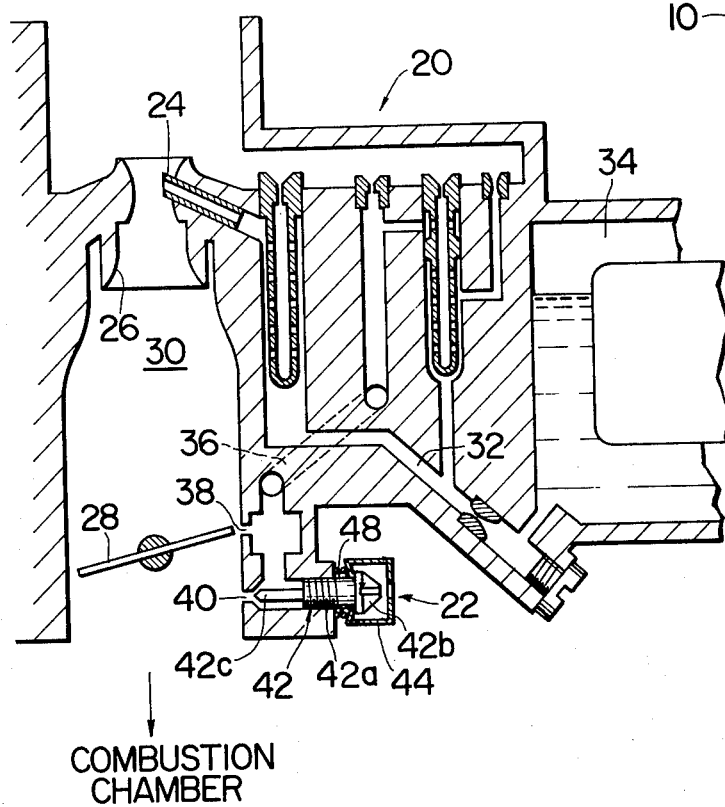
FIG. 4 is a vertical section view of a fixed-venturi carburetor incorporating therein a preferred example of an idle mixture adjusting device according to the present invention.

Referring now to FIG. 4 of the drawings, there is shown a fixed-venturi (choke) carburetor, generally designated by the reference numeral 20, incorporating therein a preferred example of a device 22 for adjusting the air-fuel ratio of the air-fuel mixture or the idle mixture supplied from the carburetor 20 into the combustion chambers of an internal combustion engine (not shown) during idling of the engine.

The carburetor 20 comprises, as usual, a main discharge nozzle 24 opened to a venturi portion 26 disposed upstream of a throttle valve 28 which is rotatably disposed in an air-fuel mixture induction passage 30 communicated with the combustion chambers of the engine. The main discharge nozzle 24 is communicated through a fuel passageway 32 of the main fuel circuit (no numeral) with a float bowl 34 filled with a fuel such as gasoline (petrol). As customary, the fuel passageway 32 is communicated through a fuel passageway 36 of the low-speed circuit (no numeral) with a slow port 38 opened to the air-fuel mixture induction passage 30 and adjacent the edge of the throttle valve 28. The slow port 38 is, in turn, communicated with an idle discharge port or hole 40 opened to the air-fuel mixture induction passage 30 downstream of the slow port 38 and the throttle valve 28 to supply the fuel into the air-fuel mixture induction passage 30 during idling of the engine.

Reference numeral 42 indicates an idle adjustment screw forming part of the idle mixture adjusting device 22 and is composed of a threaded portion 42a movably engaged with the body of the carburetor 20, a screw head 42b integral with one end of the threaded portion 42a, and a needle valve portion 42c integral with the other end of the threaded portion 42a and located adjacent the idle discharge port 40. This idle adjustment screw 42 is, as usual, arranged to control the amount of fuel discharged through the idle discharge port 40 into the air-fuel mixture induction passage 30 such that the amount of the discharge fuel is decreased as the needle valve portion 42c is advanced or moved in the direction of idle discharge port 40 by turning the screw head 42b to decrease the cross-sectional area of the idle discharge port 40, whereas the amount of the same is increased as the needle valve portion 42c is withdrawn or moved in the opposite direction of the idle discharge port 40. Covering the screw head 42b of the idle adjustment screw 42 is a cap 44 or a covering member 44 which is movably secured to the threaded portion 42a of the idle adjustment screw 42.

Figure 5:
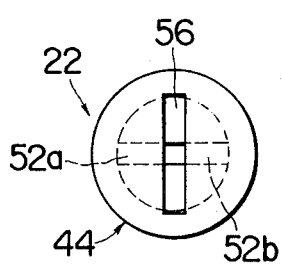
FIG. 5 is an enlarged plan view showing the idle mixture adjusting device of FIG. 4.
Figure 6:
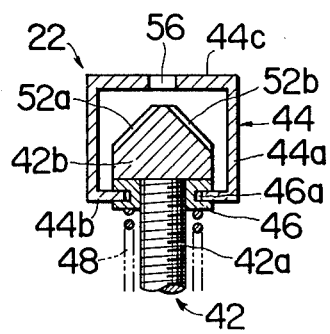
FIG. 6 is a vertical section view of the device of FIG. 5.
Figure 7:
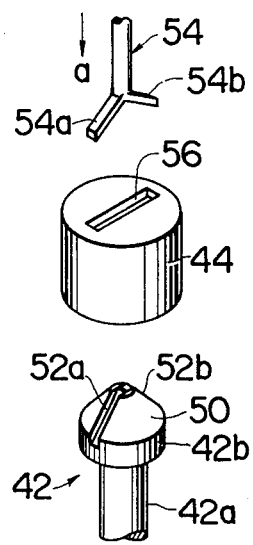
FIG. 7 is a perspective illustration showing the device of FIG. 5.

FIGS. 5 to 7 show in detail the idle mixture adjusting device 22 in which the cap 44 is composed of a cylindrical portion 44a surrounding the screw head 42b, a flange portion 44b integral with one end of the cylindrical portion 44a, and a circular lid portion 44c integral with the other end of the cylindrical portion 44a. The flange portion 44b may be the shape of a plurality of nails i.e. the flange portion 44b is formed by a plurality of annularly arranged nails or projections each of which has a pointed edge and is movably disposed in the annular groove 46b. The cap 44 is turnably secured to the surface of the threaded portion 42a of the idle adjustment screw 42 in such a manner that the flange portion 44b is disposed within an annular groove 46a formed along the peripheral surface of a cylindrical collar 46 which is disposed around the threaded portion 42a of the idle adjustment screw 42. Additionally, the cylindrical collar 46 is urged to contact with the bottom surface of the screw head 42b by a coiled spring 48 seated on the body of the carburetor 20. It is to be noted that the cap 44 can be easily and smoothly turned around the screw head 42b by the effect of the cylindrical collar 46 which is made, for example, of nylon, when a turning force is applied thereto. In this example, the screw head 42b is formed at its top surface with a conical portion 50 as best seen in FIG. 7. On the surface of the conical portion 50, two straight grooves 52a and 52b or first engageable means are formed and connected to each other at the vertex of the conical portion 50. Each of the two straight grooves 52a and 52b extends from the vertex of the conical portion to the periphery of the screw head 42a. The two straight grooves 52a and 52b are aligned straight as clearly shown in FIG. 5.

Indicated by the reference numeral 54 is a turning tool or an adjusting tool for turning the idle adjustment screw 42 to adjust the air-fuel ratio of the idle mixture. The turning tool 54 has at its one end two finger-like members 54a and 54b or second engageable means which is engageable with the grooves 52a and 52b of the idle adjustment screw 42. While the one end of the turning tool 54 is formed into a Y-shape in this example, it may be formed into a shape which is produced by cutting off a V-shaped portion of the edge of a screwdriver having a flat edge. With this connection, the cap 44 has at its circular lid portion 44c a slot 56 in the shape which is produced by projecting the finger-like members 54a and 54b from the direction of an arrow a on the surface of the circular rid portion 44c and accordingly the shape is of a straight line as shown. The area of slot 56 defined on the surface of the circular lid portion 44c of the cap 44 is formed generally same as the projected area of the finger-like members 54a and 54b, or slightly larger than the projected area in order to smoothly pass the finger-like members 54a and 54b of the adjusting tool 54 through the slot 56 of the cap 44.

With the arrangement hereinbefore described, when an adjustment or change of the air-fuel ratio of the idle mixture is required, the finger-like members 54a and 54b of the adjusting tool 54 is inserted through the slot 56 into the cap 44 and thereafter the cap 44 is turned until the slot 56 of the cap 44 meets with the grooves 52a and 52b of the idle adjustment screw 42 if the both do not meet with each other, for example, as shown in FIG. 5. Subsequently, the finger-like members 54a and 54b of the adjusting tool 54 is reached and engaged with the grooves 52a and 52b formed on the surface of the screw head 42b of the idle adjustment screw 42. In this state, the idle adjustment screw 42 is turned, by turning the adjusting tool 54, to an extent required for obtaining an appropriate air-fuel ratio of the idle mixture.

It will be understood from the foregoing, that the idle adjustment screw 42 cannot be turned and therefore the idle mixture cannot be adjusted or changed without use of the particularly designed adjusting tool mentioned above. If drivers intend to turn the idle adjustment screw 42 with a screw-driver having a flat edge, the edge of the screw driver may pass through the slot 56 formed at the cap 44 to contact the vertex of the conical portion 50 of the idle adjustment screw 42, but cannot turn the idle adjustment screw 42 since the edge of the screw-driver will turn only itself at the vertex portion of the screw head 42b when turned by the drivers. Of course, even if the cap 44 is forced to turn, only the cap 44 itself turns around the threaded portion 42a of the idle adjustment screw 42 and therefore the adjustment of the idle mixture is impossible.

However, using the above-mentioned particularly designed adjusting tool 54, the one end of the adjusting tool 54 fits and engages with the grooves 52a and 52b formed on the surface of the screw head 42b of the idle adjustment screw 42 and therefore the idle adjustment screw 42 may be easily turned to adjust or change the idle mixture. Accordingly, the air-fuel ratio of the idle mixture may be adjusted or changed as occasion demands if the particular adjusting tool 54 is supplied in factories and service factories where exhaust gas analyzers are equipped.

Figure 8:
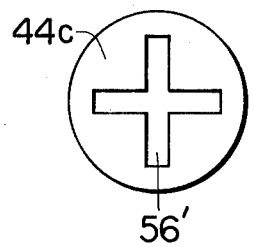
FIG. 8 is an enlarged plan view of a modified example of the idle mixture adjusting device of FIG. 4.
Figure 9:
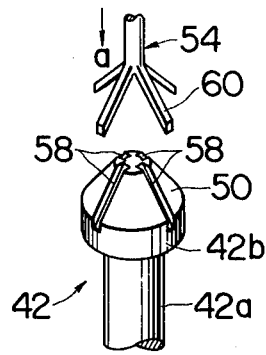
FIG. 9 is a perspective illustration showing the device of FIG. 8.

FIGS. 8 and 9 show a modified example of the idle mixture adjusting device 22 which is similar to the example shown in FIGS. 5 to 7. In the device 22, the conical portion 50 of the screw head 42b of the idle adjustment screw 42 has four straight grooves 58 or the first engageable means formed on the surface thereof. Each of the four straight grooves 58 extends from the vertex of the conical portion 50 to the periphery of the screw head 42b. With this connection, the adjusting tool 54 is formed at its one end four finger-like members 60 or the second engageable means which are respectively engageable with the four straight grooves 58 of the idle adjustment screw 42. Additionally, the circular rid portion 44c of the cap 44 is formed with the slot 56' of a shape produced by projecting the four finger-like members 60 of the adjusting tool 54 in the direction of the arrow $a$ on the surface of the circular rid portion 44c of the cap 44 and accordingly the shape of the slot 56' is of a cross in this example as seen in FIG. 8. It will be understood that the four straight grooves 58 of the idle adjustment screw 42 of this example is arranged such that adjacent two grooves constitute the right angle therebetween.

With this arrangement, turning of the idle adjustment screw 42 by the adjusting tool 54 is securer than in the example shown in FIGS. 5 to 7, because if a part of the grooves 58 is worn out, the remaining grooves securely engage with the finger-like members 60 of the adjusting tool 54. It will be appreciated that the idle adjustment screw 42 having four grooves 58 shown in FIG. 9 may be turned with the adjusting tool 54 having two finger-like members 54a and 54b as shown in FIG. 7.

Figure 10:
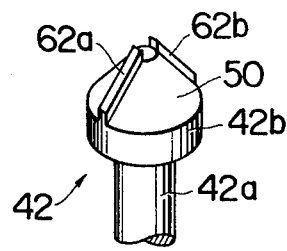
FIG. 10 is a perspective illustration of another modified example of the idle mixture adjusting device of FIG. 4.

FIG. 10 shows the screw-head 42b of another modified example of the idle mixture adjusting device 22. The screw head 42b is similar to one shown in FIG. 7 except that two straight elongate projections 62a and 62b are formed on the surface of the conical portion 50 of the screw head 42b instead of the two straight grooves 52a and 52b shown in FIG. 7. It will be understood that the projections 62a and 62b may be engageable at their sides with the sides of the second engageable means of the adjusting tool 54 mentioned hereinbefore, and accordingly the idle adjustment screw 42 shown in FIG. 10 may be turnable with the adjusting tools shown in FIGS. 7 and 9.

Figure 11:
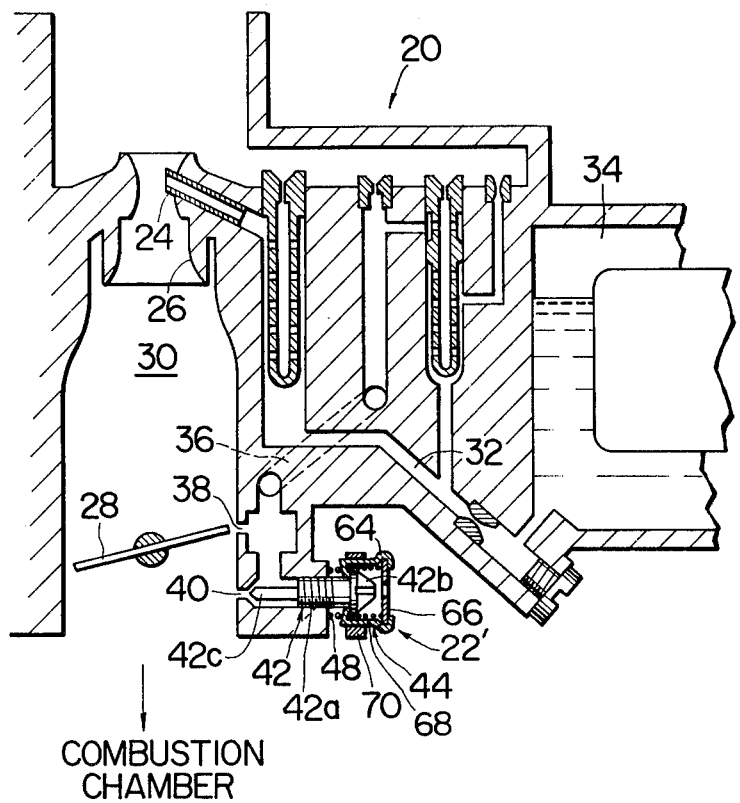
FIG. 11 is a vertical section view of the fixed-venturi carburetor incorporating therein another preferred example of the idle mixture adjusting device in accordance with the present invention.

FIG. 11 illustrates another preferred example of the idle mixture adjusting device 22' which is incorporated with the carburetor same as one shown in FIG. 4, in which like reference numerals to those in FIG. 4 represent like parts and elements for the purpose of simplicity of illustration. The cap 44 or the covering member is composed of a cylindrical member 64 which surrounds the screw head 42b of the idle adjustment screw 42. The cylindrical member 64 is formed at its one end with a flange portion 64a and at the other end with an annular groove 64b. The flange portion 64a is, as shown, contactable to the bottom surface of the screw head 42b and urged in the direction to contact the screw head 42b by the coiled spring 48 seated on a portion of the carburetor body. A disc member 66 is turnably disposed or received at the annular groove 64b of the cylindrical member 64. The disc member 66 is urged by a spring 68 disposed inside of the cylindrical member 64 so that the free movement of the disc member 66 within the annular groove 64b is prevented. Secured to the outer surface of the cylindrical member 64 is a member 70 for preventing the turning movement of the cylindrical member 64 with respect to the carburetor body.

Figure 12:
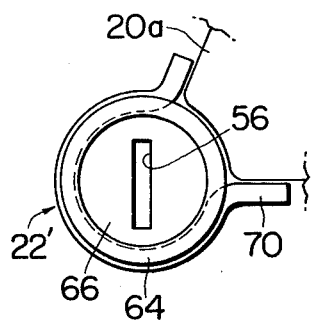
FIG. 12 is an enlarged plan view of the idle mixture adjusting device showing the device of FIG. 11.
Figure 13:
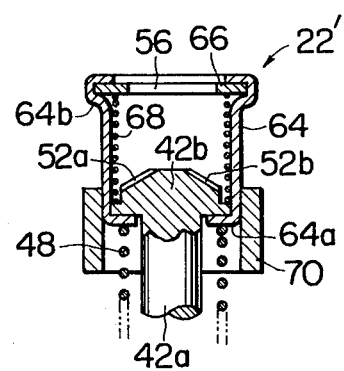
FIG. 13 is a vertical section view showing the device of FIG. 12.
Figure 14:
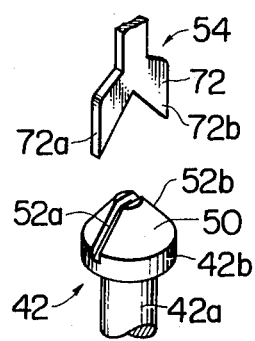
FIG. 14 is a perspective illustration showing the device of FIG. 12.

FIGS. 12 to 14 show in detail the idle mixture adjusting device 22' shown in FIG. 11, in which the member 70 secured to the outer surface of the cylindrical member 64 is slidably engaged with a projection 20a of the carburetor body so that only the axial movement of the cylindrical member 64 is permitted, i.e. the cylindrical member 64 is only movable in the direction of the longitudinal axis of the screw 42. As best seen in FIG. 13, the spring 68 is seated on the annular spring seat (no numeral) formed at the peripheral portion of the screw head 42b. In this example, the screw head 42b of the idle adjustment screw 42 is formed at its top surface with the conical portion 50 on which surface the two straight grooves 52a and 52b or the first engageable means same as in example shown in FIG. 7 are formed as seen in FIG. 14. With this connection, the turning tool 54 or the adjusting tool is formed, as seen in FIG. 14, with a generally Y-shaped bifurcate plate member 72 or the second engageable means of which two plate members 72a and 72b are respectively engageable with the two grooves 52a and 52b of the idle adjustment screw 42. The bifurcate plate member 72 may be in the shape formed by cutting off a V-shaped portion of the edge of a screw-driver having a flat edge. Additionally, the disc member 66 is formed with the slot 56 in the shape of the straight line which shape is determined same as in the example shown in FIGS. 5 to 7. With this arrangement, the bifurcate plate member 72 is inserted passing through the slot 56 into the cap 44 and thereafter engaged with the grooves 52a and 52b of the idle adjustment screw 42. Then, the idle adjustment screw 42 is turned by an extent required with the adjusting tool 54.

Figure 15:
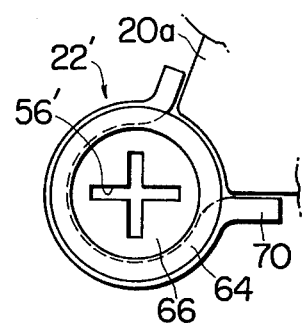
FIG. 15 is an enlarged plan view of a modified example of the idle mixture adjusting device of FIG. 11.
Figure 16:
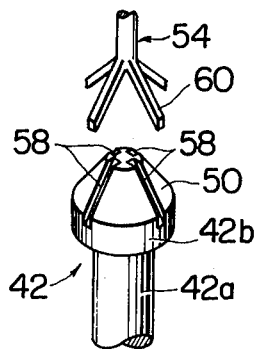
FIG. 16 is a perspective illustration showing the device of FIG. 15.

FIGS. 15 and 16 show a modified example of the idle mixture adjusting device 22', in which the screw head 42b of the idle adjustment screw 42 is formed at the surface of its conical portion with the four straight grooves 58 or the first engageable means which are same as in the example shown in FIG. 9. Additionally, the adjusting tool 54 is formed at its one end with the four finger-like members 60 or the second engageable means which is same as in the example shown in FIG. 9. With this connection, the disc member 66 has the slot 56' in the shape of the cross same as in the example shown in FIG. 8. It will be understood that the four finger-like members 60 of the adjusting tool 54 is inserted through the cross-shaped slot 56' into the cap 44 to engage respectively with the four straight grooves 58 of the idle adjustment screw 42.

Figure 17:
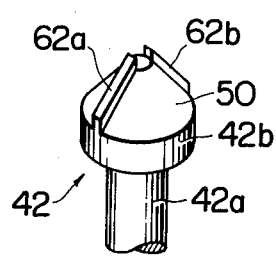
FIG. 17 is a perspective illustration of another modified example of the idle mixture adjusting device of FIG. 11.

FIG. 17 shows the screw head 42b of another modified example of the idle mixture adjusting device 22' in which the screw head 42b is formed at the top surface of its conical portion 50 with the two straight elongate projections 62a and 62b or the first engageable means which are same as in the example shown in FIG. 10.

Figure 18:
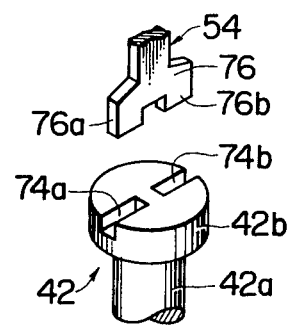
FIG. 18 is a perspective view of a further modified example of the idle mixture adjusting device of FIG. 11.

FIG. 18 shows a further modified example of the idle mixture adjusting device 22' in which the top surface of the screw head 42b of the idle adjustment screw 42 is formed flat. As seen, the two opposite grooves 74a and 74b or the first engageable means are formed on the top surface of the screw head 42b and extend from the central portion of the flat top surface to the periphery of the screw head 42b. With this connection, the adjusting tool 54 is formed at its one end with a bifurcate plate member 76 or the second engageable means which has two plate portions 76a and 76b. The two plate portions 76a and 76b are respectively arranged to be engageable with the two opposite grooves 74a and 74b of the idle adjustment screw 42.

Figure 19:
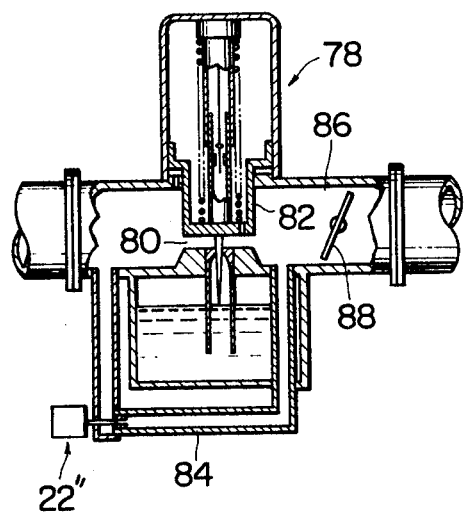
FIG. 19 is a vertical section view of a variable-venturi carburetor incorporating therein a further preferred example of the idle mixture adjusting device in accordance with the present invention.
Figure 20:
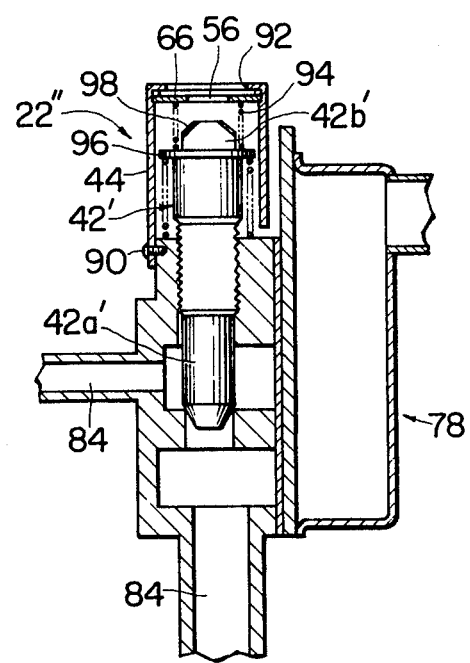
FIG. 20 is an enlarged vertical section view showing the idle mixture adjusting device of FIG. 19.

FIGS. 19 and 20 illustrate a variable-venturi (choke) carburetor, represented by the reference numeral 78, of an internal combustion engine, incorporating therein a further preferred example of the idle mixture adjusting device 22". The carburetor 78 is arranged such that the choke area of a venturi portion 80 is controlled by a movable piston 82 subjected to the vacuum of the intake air on its upper surface and atmospheric pressure below to maintain the venturi vacuum constant. In this carburetor 78, indicated by the reference numeral 84 is a passageway connecting an air induction passage 86 upstream of the venturi portion 80 and the air induction passage 86 between the venturi portion 80 and a throttle valve 88 rotatably disposed within the air induction passage 86. Disposed in the passageway 84 is the idle mixture adjusting device 22" which will be described in detail hereinafter with reference to FIG. 20. In FIG. 20, the idle mixture adjusting device 22" is composed of the idle adjustment screw 42' which has a body portion 42a', and a screw head 42b' integral with the one end of the body portion 42a'. The other end of the body portion 42a' is formed into a valve head (no numeral). The idle adjustment screw 42' is movably screwed into the body of the carburetor 78 so that the valve head formed at the body portion 42a' of the screw 42' is contactable with a valve seat (no numeral) formed inside the passageway 84.

The covering member or the cap 44 surrounds and covers the screw head 42b' of the idle adjustment screw 42' and secured to the body of the carburetor 78 by fastening means 90 such as a machine screw or a rivet. Disposed turnably at the groove (no numeral) formed adjacent the upper open end 92 of the cap 44 is a disc member 66 which is urged by a spring 94 seated on a flange portion 96 of the idle adjusting screw 42' in the direction to prevent the free movement of the disc member 66. The disc member 66 has the slot 56 of the shape corresponding to the first engageable means 98 such as the grooves or projections formed on the top surface of the screw head 42b' of the idle adjustment screw 42'. While the shapes of the first engageable means 9.8 formed on the screw head 42b' and the slot 56 of the disc member 66 has not been clearly shown, it will be understood that the relationship of them is same as in the various examples shown and described hereinbefore. It will also be appreciated that the second engageable means of the adjusting tool or the turning tool (not shown in this example) will be arranged to be engageable with the first engageable means of the idle adjustment screw 42' after passing through the slot 56 of the disc member 66. Accordingly, the relationship of the shape of the second engageable means to those of the first engageable means 98 and the slot 56 is same as in the embodiments shown and described hereinbefore.

With the arrangement shown in FIGS. 19 and 20, the cross-sectional area defined by the valve seat formed inside the passageway 84 is controlled by turning the idle adjustment screw 42' to control the amount of air supplied to the air induction passage 86 between the venturi portion 80 and the throttle valve 88. Therefore, the air-fuel ratio of the idle mixture or mixture supplied during idling of the engine may be adjusted by turning of idle adjustment screw 42' with the adjusting tool 54 used in the various examples described and shown hereinbefore.

It will be understood that since the cylindrical member 64 of the cap 44 in the embodiment shown in FIGS. 11 through 20 is secured to the carburetor body so that the turning of the cylindrical member 64 is prevented, the usual driver cannot turn the idle adjustment screw 42 if the driver nips the cylindrical member 64 of the cap with a nipping tool such as pliers, or tongs. In this connection, the cap 44 of the embodiment shown in FIGS. 4 through 10 is turnable around the idle adjustment screw 42 and accordingly the idle adjustment screw 42 may be unnecessarily turned with the nipping tool by the usual driver.

As is apparent from the foregoing discussion, according to the present invention, the usual drivers cannot turn the idle adjustment screw of the carburetor and accordingly cannot unnecessarily change the idle mixture which has been appropriately set in consideration of the control of noxious gas emission during idling of the engine. However, the idle mixture may be changed and adjusted when necessary by turning the adjustment screw with the particularly designed adjusting tool which is equipped, for example, in service factories.

What is claimed is:

1. A Combination comprising:
   An idle adjustment screw turnably and operatively installed in a carburetor of an internal combustion engine, for adjusting an air-fuel mixture supplied to the engine during idling of the engine when turned, said idle adjustment screw having a screw head formed with first engageable means;
   a turning tool for turning the screw head of said idle adjustment screw, said turning tool having an end portion formed with second engageable means which is engageable with the first engageable means of said idle adjustment screw to turn said idle adjustment screw after the second engageable means engages with the first engageable means; and
   a covering member for covering the screw head of said idle adjustment screw, said covering member including
   a cylindrical member surrounding the screw head of said idle adjustment screw and secured to the body of the carburetor so that only its axial movement is permitted, said cylindrical member having an annular groove formed at one end thereof and a flange portion at the other end thereof, the flange portion being contactable to the bottom surface of the screw head of said idle adjustment screw,
   a disc member turnably received at the annular groove of said cylindrical member the disc member having a slot formed through the wall thereof, the slot being generally in the shape which is produced by projecting the shape of the second engageable means on the surface of said disc member,
   a first spring disposed inside of said cylindrical member to urge the disc member so that the movement of the disc member within the annular groove of said cylindrical member is restricted, and
   a second spring disposed between the body of the carburetor and the flange portion of said cylindrical member to urge the flange portion to contact the bottom surface of the screw head of said idle adjustment screw.

2. A combination as claimed in claim 1, in which said idle adjustment screw is movably disposed adjacent an idle discharge port of a fixed-venturi carburetor of the engine to control the cross-sectional area of the idle discharge port to control the fuel amount supplied from the idle discharge port into the air-fuel mixture induction passage of the carburetor, the idle discharge port being communicated with the float bowl of the carburetor and opening to the air-fuel mixture induction passage downstream of a throttle valve of the carburetor.

3. A combination as claimed in claim 2, in which the top surface of the screw head of said idle adjustment screw is formed flat, in which the first engageable means includes two opposite grooves formed on the flat top surface of the screw head, each of two opposite grooves extending from the central portion of the flat top surface to the periphery of the screw head, in which the second engageable means includes a bifurcate plate member of which two portions are respectively engageable with the two opposite grooves.

4. A combination as claimed in claim 2, in which the screw head of said idle adjustment screw is formed, at its top surface, with a conical portion.

5. A combination as claimed in claim 4, in which the first engageable means of said idle adjustment screw includes two straight grooves formed on the surface of the conical portion of the screw head, each of two straight grooves extending from the vertex of the conical portion to the periphery of the screw head, in which the second engageable means of said turning tool includes a bifurcate plate member of which two plate portions are respectively engageable with the two straight grooves of the conical portion of said idle adjustment screw, in which the slot of said covering member is formed straight.

6. A combination as claimed in claim 4, in which the first engageable means of said idle adjustment screw includes four straight grooves formed on the surface of the conical portion of the screw head, each of the four straight grooves extending from the vertex of the conical portion to the periphery of the screw head, in which the second engageable means of said turning tool includes four finger-like members which are respectively engageable with the four straight grooves of the conical portion of said idle adjustment screw, in which the slot of said covering member is formed into the shape of a cross.

7. A combination as claimed in claim 4, in which said first engageable means of said idle adjustment screw includes two straight elongate projections formed on the surface of the conical portion, each of the projections extending from the vertex of the conical portion to the periphery of the screw head.

* * * * *